United States Patent [19]

Mackirdy

[11] Patent Number: 5,448,810
[45] Date of Patent: Sep. 12, 1995

[54] METAL CASKET CONSTRUCTION

[75] Inventor: William I. Mackirdy, Scott Run, Pa.

[73] Assignee: Casket Shells, Incorporated, Eynon, Pa.

[21] Appl. No.: 110,438

[22] Filed: Aug. 23, 1993

[51] Int. Cl.⁶ .............................................. A61G 17/00
[52] U.S. Cl. ................................................ 27/6; 27/14; 27/17; 27/35
[58] Field of Search ................... 27/4, 5, 6, 10, 14, 27/17, 35; 29/469.5, DIG. 3, 513; 220/4.28, 4.33, 690, 4.01, 682, 638

[56] References Cited

U.S. PATENT DOCUMENTS

| | | | |
|---|---|---|---|
| 347,172 | 8/1886 | Gould et al. | 27/6 |
| 801,264 | 10/1905 | Post | 27/6 |
| 2,062,492 | 12/1936 | Beck | 27/6 |
| 3,050,160 | 8/1962 | Chesser | 29/513 |
| 4,759,105 | 7/1988 | Buerosse | 27/6 |

*Primary Examiner*—Carl D. Friedman
*Assistant Examiner*—Kien T. Nguyen
*Attorney, Agent, or Firm*—Kane, Dalsimer, Sullivan, Kurucz, Levy, Eisele and Richard

[57] ABSTRACT

A metal casket shell will include sides, ends, bottoms and lids blanked and formed from pre-painted or pre-finished material. The connections of these parts employing prongs or tabs or both thereby eliminating the need to weld and grinding these joints.

19 Claims, 5 Drawing Sheets

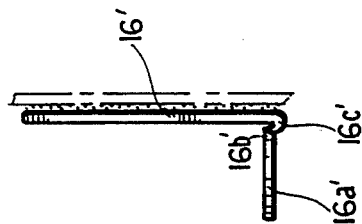
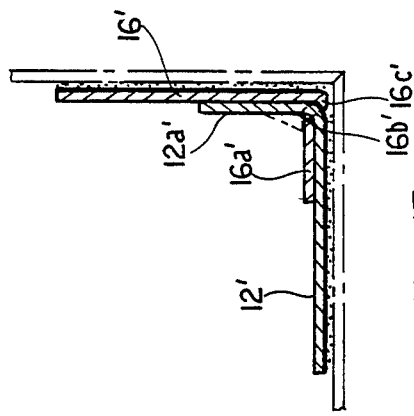
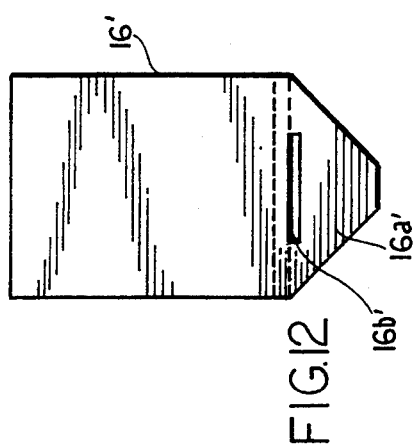
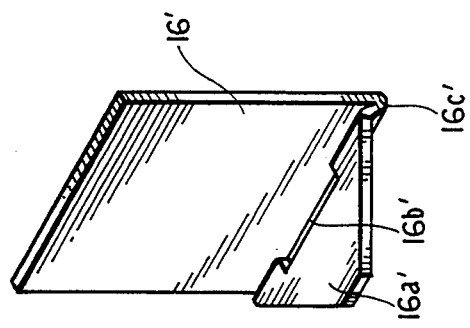
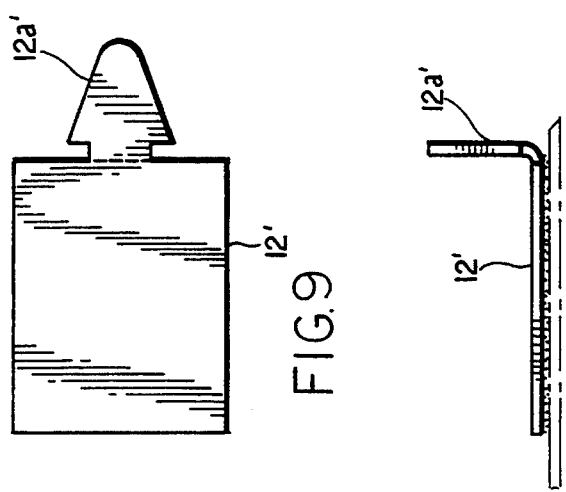
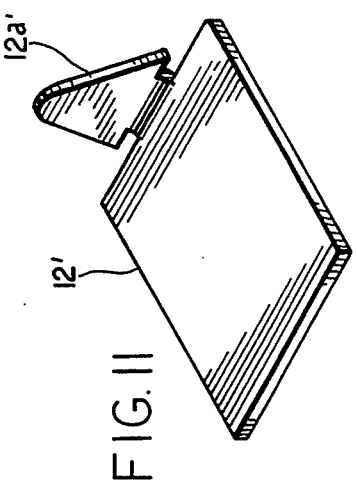

METAL CASKET CONSTRUCTION

BACKGROUND OF THE INVENTION

Metal caskets are expensive because manufacturing and assembling the parts is labor intensive and also requires many manipulative steps to finish and trim the assembled unit to meet consumer satisfaction and acceptance. Normally steel, bronze or copper is utilized and the sides, ends, lid and bottom are stamped from sheet material and then pressed into the desired configuration. The sides, ends and bottom are welded together and the lid hinged and latched to the sides. The welds and joints are subjected to a grinding operation to enhance their appearance and then the sides, ends and lid are spray painted. The interior of the thusly formed shell is trimmed in one of many styles Obviously if any one of the assembly steps is eliminated or rendered more efficient the cost of manufacturing metal caskets could be significantly reduced.

SUMMARY OF THE INVENTION

It is a principal object of the present invention to blank and form the casket sides, ends, bottoms and lids from pre-painted and pre-finished material which are thereafter connected without the need for welding and grinding.

Another object is to provide a casket of the foregoing type having novel means for connecting the sides, ends and bottom.

A further object is to provide casket sides, ends, bottoms and lids that are pre-painted and pre-finished and substantially flat and, consequently may be shipped at low cost for eventual assembly into a finished casket shell at another selected location.

Other objects and advantages will become apparent form the following detailed description which is to be taken in conjunction with the accompanying drawings.

BRIEF DESCRIPTION OF THE DRAWINGS

FIG. 9 is an elevation of a stamped prong connector prior to bending;

FIG. 10 is a side view of the stamped connector of FIG. 9 following bending;

FIG. 11 is a perspective view of a prong connector bent and ready for application to a casket part to cooperate in forming a corner;

FIG. 12 is an elevation of a stamped slotted 4 connector prior to bending;

FIG. 13 is a side view of the bent slotted connector with a casket part shown in phantom;

FIG. 14 is a perspective view of the stamped and bent slotted connector ready for application to a casket part to cooperate in forming a corner;

FIG. 15 is a cross-sectional view showing the connection of a prong connector and slotted connector with the connected casket parts shown in phantom.

DETAILED DESCRIPTION

Figure 1:
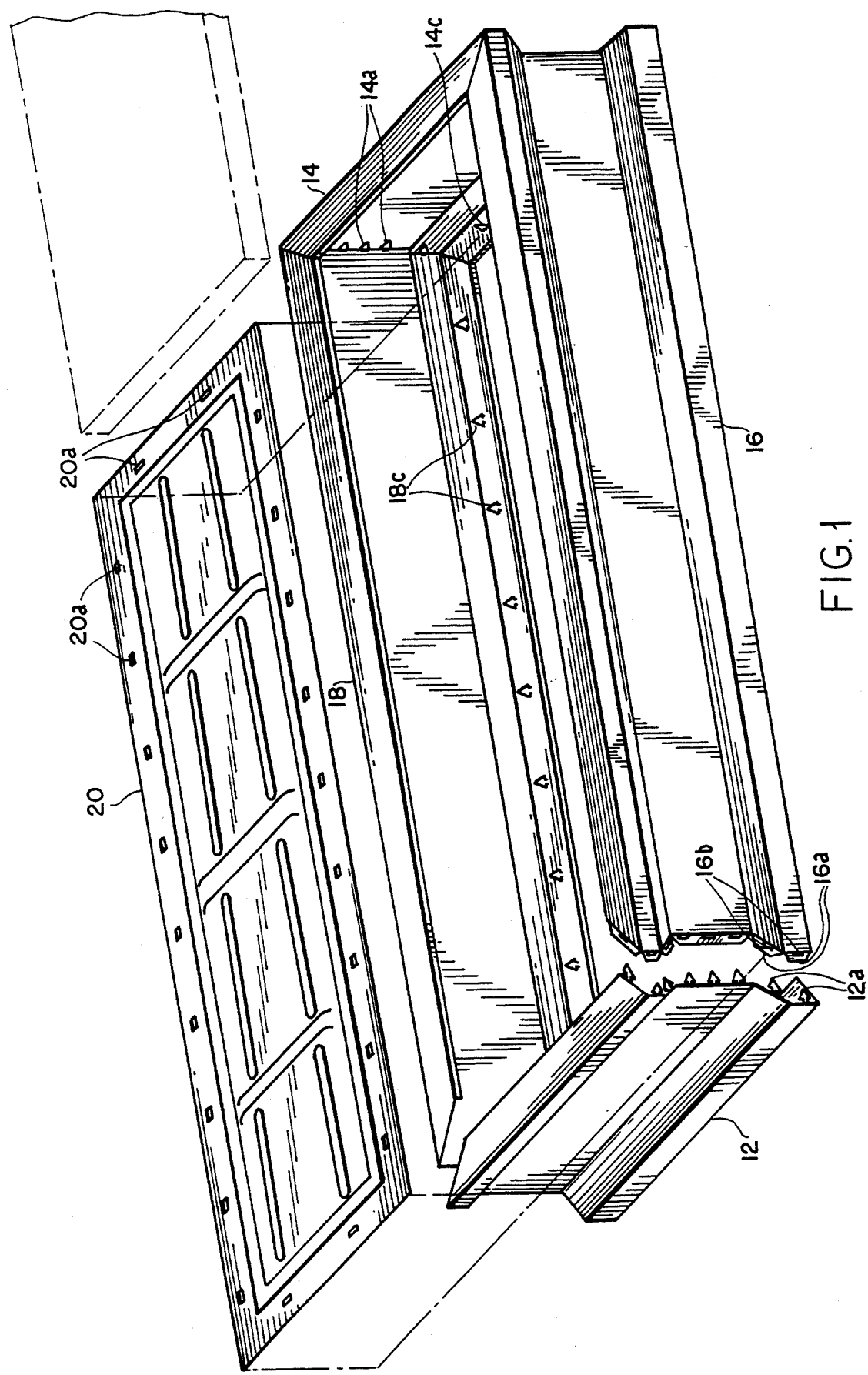
FIG. 1 is an exploded perspective view of casket parts including sides, ends and bottom incorporating the teachings of the present invention with a lid shown schematically and fragmentarily.

In the drawings, a metal casket shell according to this invention will include sides, ends, bottoms and lids blanked and formed from pre-painted or pre-finished material. In this connection, welding and grinding normally employed in making a metal casket shell need not be performed.

Towards that end, ends 12 and 14 will be formed with prongs or tongues 12a and 14a, respectively. Sides 16 and 18 will be formed with tabs 16a and 18a formed with slots 16b and 18b, respectively. As will be explained in detail the prongs are adapted to be inserted in the slots and then bent or twisted to secure the ends and sides together.

The bottom 20 is connected to the ends 12, 14 and sides 16, 18 in similar fashion. Prongs 12c, 14c, 16c and 18c on the ends and sides are adapted to be received in slots 20a formed in the bottom 20 and then bent or twisted to secure the base in place.

Figure 2:
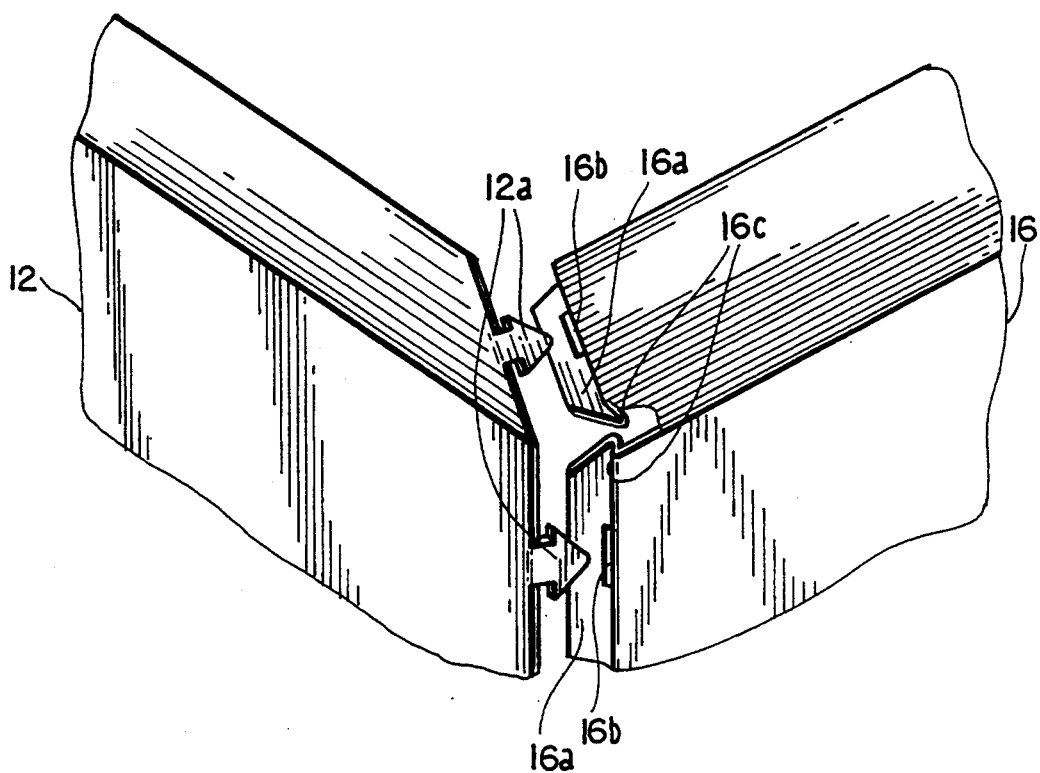
FIG. 2 is an enlarged fragmentary view showing parts of the side and end prior to being connected to form a corner.
Figure 3:
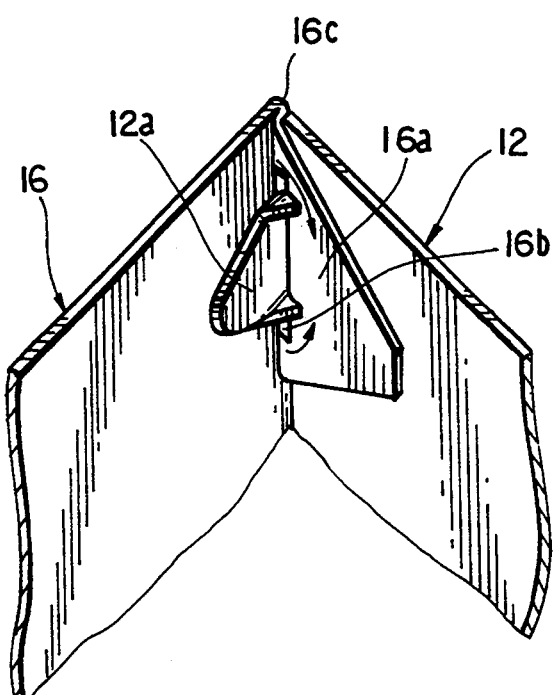
FIG. 3 is a further enlarged fragmentary view of a corner showing how a tab is disposed in a slot.
Figure 5:
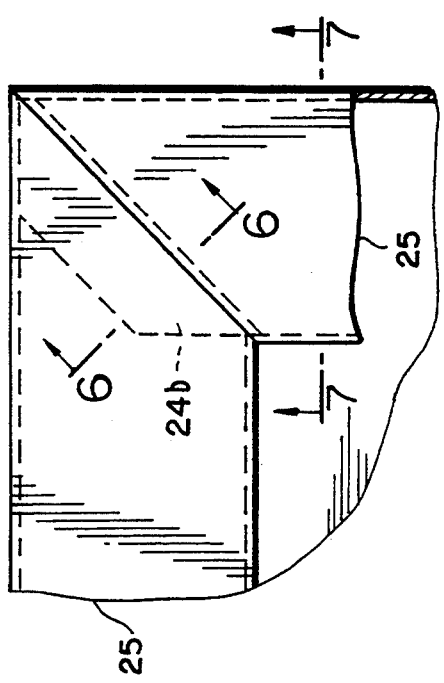
FIG. 5 is a fragmentary bottom view of the connected lid corner.
Figure 7:
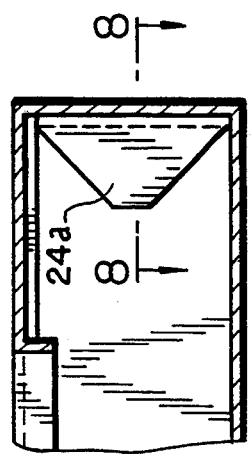
FIG. 7 is a fragmentary sectional view taken along the line 7—7 of FIG. 5.
Figures 6, 8:
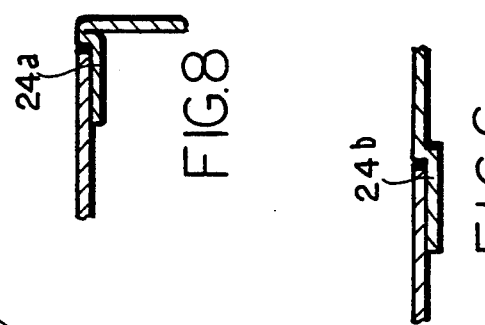
FIG. 6 is a fragmentary sectional view taken along the line 7—7 of FIG. 5.
FIG. 8 is a fragmentary sectional view taken along the line 8—8 of FIG. 7.

The ends and sides with integral prongs and slotted tabs will be assembled as shown in FIGS. 1, 2 and 3. Initially adhesive or double faced pressure sensitive tape may be applied to the external face of slotted tabs 16a. It should be noted that the tabs include a double fold at 16c which will accommodate the thickness of the sheet metal end 12 so that the corner thus formed will be flush with no exposed edges. The prongs 12a are pushed into the slots 16b and the prongs tip are then twisted or otherwise deformed to hold the prongs in the slots as shown in FIG. 3. This action will pull the section of material with the prong into the rolled edge groove when the tab is formed. This will cover the raw edge of the prong section. As will be apparent the adhesive will contribute to the securement of the corner.

After the four corners formed by the ends 12, 14 and sides 16, 18 are made, the bottom 20 may then be inserted. Adhesive or double faced pressure sensitive tape may be applied to the flat lower peripheral surface of the sides and ends on which prongs 12c, 14c, 16c and 18c are raised and on which the bottom seats. The bottom slots 20a are aligned over the prongs 12c, 14c, 16c and 18c and the bottom 20 is pushed down until the prongs protrude through the slots. The prongs are then twisted or bent or pushed over to a 90° angle to lock the bottom in place with the assistance of the applied adhesive or tape. Obviously, the prongs and slotted tabs can be on the sides and ends, respectively or both and still be within the spirit of the present invention.

An alternate method of attaching end and side corners is shown in FIGS. 9 to 15. In this regard, blanked or stamped parts are formed to produce 90° corners, with the parts being numbered to correspond with parts of the previous embodiment with an accompanying prime. Thus, the pronged part 12' will be blanked or stamped with tongue 12a' which will be bent 90° along the indicated bend line. The slot part 16' will be stamped with slot 16b' and then bent to provide the double bend 16c' to accommodate the thickness of the end 12' and the part 12'. The parts 12' and 16' may be adhered to the selected end and side shown in phantom in FIGS. 10, 13, and 15, with adhesive or adhesive tape. Thereafter the prongs 12a' of pieces 12' are inserted into the slots 16b' of the pieces 16' and then twisted or bent to secure the corners also with the aid of adhesive as described for the initial embodiment.

Figure 4:
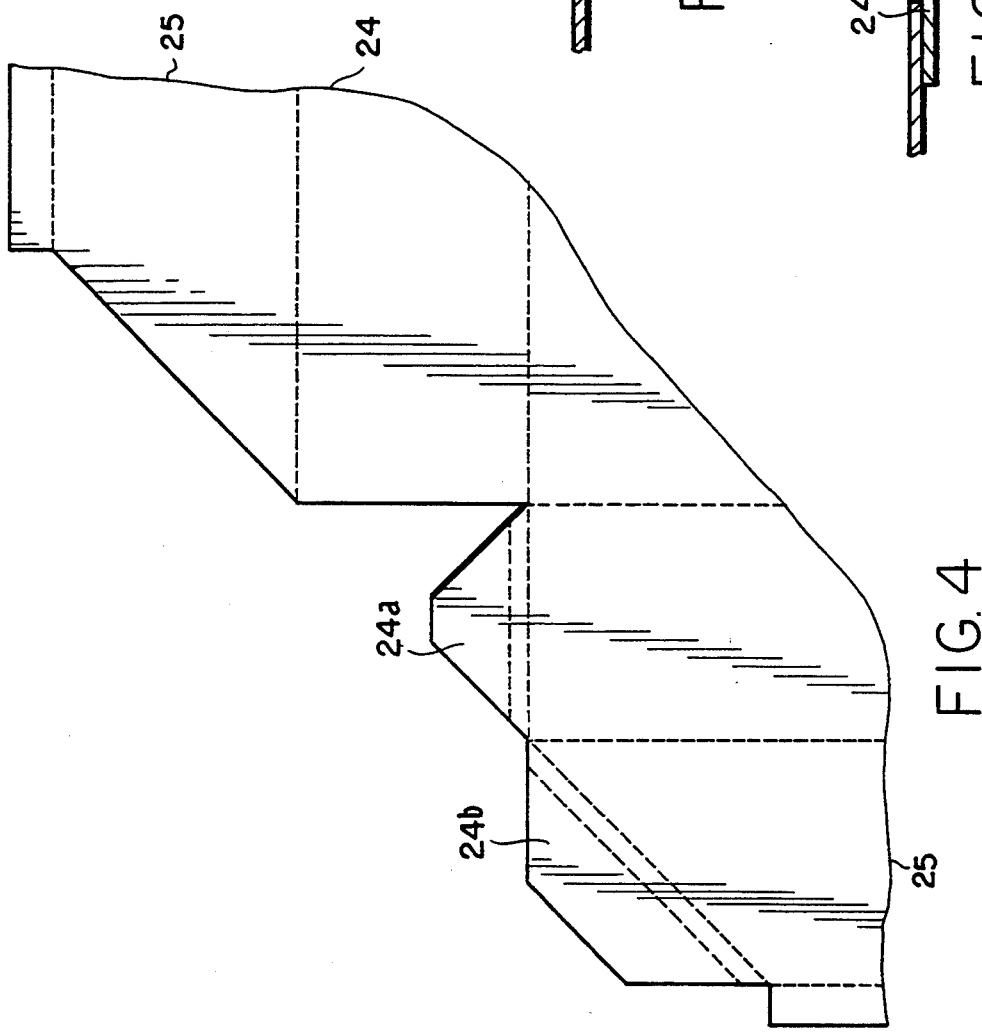
FIG. 4 is an enlarged fragmentary view of a stamped sheet of metal prior to bending that will constitute a corner of a lid.
Figure 5A:
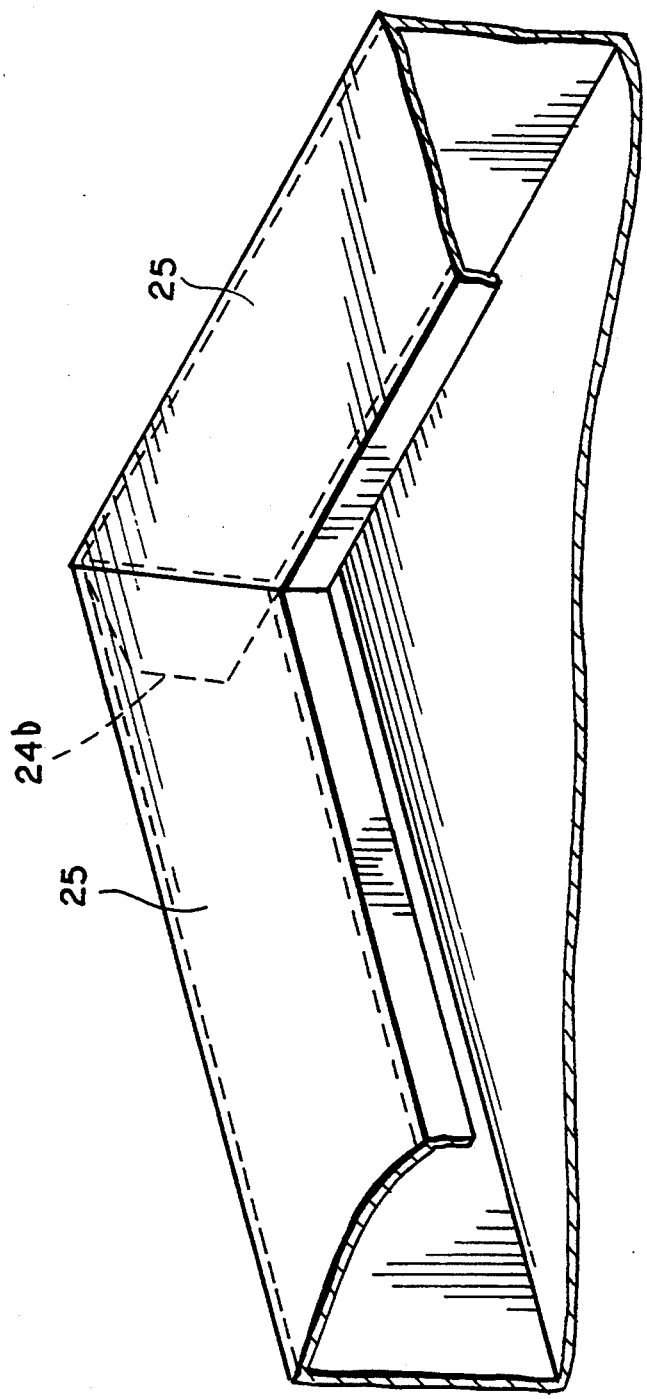
FIG. 5A is an enlarged fragmentary perspective view of a connected lid corner.

The assembly of the casket lid normally hinged to one of the sides and latched to the other is shown in FIGS. 4-8. The stamped or blanked lid 24 is shown in FIG. 4 with the fold or bend lines dotted. Tabs 24a and 24b will be punched at the four corners of the flat lid blank. The tabs will be formed as shown and bent along the indicated bend lines so that they slide below the mating or associated surface to make a flat joint as show. Adhesive or adhesive tape will be applied to the tabs. As the corner is formed up, the tab with the adhesive will slide under the mating surfaces and hold the joint together. Base flange 25 from which extends tabs 24b, will rest on the ends and sides of the casket.

Accordingly, by forming the sides, ends, bottoms and lids with mechanical and adhesive joints as described in the above, the need for welding and grinding is eliminated. This advantageously permits the use of materials that are pre-painted and pre-finished without destroying the outside surface of the casket, which material may be shipped flat thereby minimizing space requirements. Thus, the invention eliminates the need to paint or finish a casket shell in a separate operation, and also permits the assembly of a casket shell at a location remote from that at which the parts are pre-painted and pre-finished.

Thus, the several aforenoted objects and advantages are most effectively attained. Although several somewhat preferred embodiments have been disclosed and describe herein, it should be understood that this invention is in no sense limited thereby and its scope is to be determined by that of the appended claims.

I claim:

1. A metal casket shell formed from parts that are pre-painted and pre-finished without the need for welding and grinding joints and corners and without destroying the outside surface of the casket to thereby eliminate the need to paint and finish a casket shell in a separate operation, the casket shell having ends, sides, a bottom and a lid, the sides and ends having a substantially flat surface on which the bottom rests, and connection means for connecting the bottom to said surface, said means including prongs and slots, the prongs extending through the slots, said prongs being deformed to prevent retraction of the prongs from the slots.

2. The invention in accordance with claim 1 wherein the slots are along the periphery of the bottom and the prongs extend vertically upwardly from the flat surface of the sides and ends.

3. A metal casket shell according to claim 1 wherein the ends and sides are joined at a plurality of corners, each corner being defined by at least one further prong and tab having a further slot, the further prong extending through the further slot and being deformed in cooperating to secure the corner.

4. The invention in accordance with claim 3 wherein a plurality of further prongs and tabs with further slots combine to secure the corner.

5. The invention in accordance with claim 4 wherein adhesive is applied between the tabs and associated surfaces of the casket shell to cooperate in securing the corner.

6. The invention in accordance with claim 3 wherein the further prong is twisted to anchor the further prong in the further slot.

7. The invention in accordance with claim 3 wherein the further prongs extend from each end that combines to form a corner and the tabs with further slots extend from each side that combines to form a corner.

8. The invention in accordance with claim 7 wherein the tabs are folded to cover the edge of the ends.

9. The invention in accordance with claim 3 wherein a plurality of further prongs and tabs with further slots combine to secure the corner, the further twisted to anchor the further prongs in the further slot, adhesive is applied between the tabs and associated surfaces of the casket shell to cooperate in securing the corner, and the tabs are folded to cover the edge of the ends.

10. The invention in accordance with claim 3 wherein a first separate part has the further prong and a second separate part has the tab with further slot, one of the parts being secured to the casket end and the other part being secured to the casket side.

11. The invention in accordance with claim 10 wherein adhesive is employed to secure the parts to the end and side.

12. The invention in accordance with claim 10 wherein a plurality of parts are employed in forming each corner.

13. The invention in accordance with claim 10 wherein the further prong is twisted to anchor the further prong in the further slot.

14. The invention in accordance with claim 10 wherein adhesive is applied between the tabs and associated surfaces of the casket shell to cooperate in securing the corner.

15. The invention in accordance with claim 10 wherein the further prongs extend from each end that combines to form a corner and the tabs with further slot extend from each side that combines to form a corner.

16. The invention in accordance with claim 10 wherein the tabs are folded to cover the edge of the ends.

17. The invention in accordance with claim 10 wherein adhesive is employed to secure the parts to the end and side, a plurality of parts are employed in forming each corner, the further prong is twisted to anchor the further prong in the slot, adhesive is applied between the tabs and associated surfaces of the casket shell to cooperate in securing the corner, the further prongs extend from each end that combines to form a corner and the tabs with further slots extend from each side that combines to form a corner, and the tabs are folded to cover the edge of the ends.

18. A metal lid for a casket formed from a substantially flat pre-painted and pre-finished stamped and blanked sheet, the lid comprising an integral top, sides and ends, a peripherally extending base flange for resting on the ends and sides of a casket, the lid top, sides, ends and base flange cooperating in defining corners of the lid, each corner including a bent tab extending from one of the lid sides and ends and being adhesively secured to associated internal surfaces of the other of the lid sides and ends, each corner including another bent tab extending from the base flange and being adhesively secured to associated internal surfaces of the base flange.

19. The invention in accordance with claim 18 wherein each tab has a base and a free end, the base of the tabs being folded upon itself for approximately the thickness of the sheet to cover an edge of the ends and sides and an edge of the base flange at each corner.

* * * * *